(12) United States Patent
Morell et al.

(10) Patent No.: US 6,516,259 B2
(45) Date of Patent: Feb. 4, 2003

(54) SAFING METHOD FOR A VEHICLE OCCUPANT PROTECTION SAFETY SYSTEM

(75) Inventors: Scott Morell, White Lake, MI (US); Dennis Ziesmer, Clarkston, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/821,264

(22) Filed: Mar. 29, 2001

(65) Prior Publication Data

US 2001/0037170 A1 Nov. 1, 2001

Related U.S. Application Data

(60) Provisional application No. 60/194,300, filed on Apr. 3, 2000.

(51) Int. Cl.[7] .............................................. B60R 21/16
(52) U.S. Cl. ............................ 701/45; 701/46; 180/232
(58) Field of Search ..................... 701/45, 46; 180/232, 180/271, 282; 280/734, 735; 340/436, 901

(56) References Cited

U.S. PATENT DOCUMENTS

| | | | |
|---|---|---|---|
| 5,436,838 A | 7/1995 | Miyamori | 701/46 |
| 5,835,007 A | 11/1998 | Kosiak | 340/436 |
| 5,835,873 A * | 11/1998 | Darby et al. | 701/45 |
| 5,890,084 A | 3/1999 | Halasz et al. | 701/45 |
| 5,916,289 A | 6/1999 | Fayyad et al. | 701/45 |
| 5,964,816 A | 10/1999 | Kincaid | 701/45 |
| 6,005,479 A * | 12/1999 | Ide | 340/438 |
| 6,141,604 A | 10/2000 | Mattes et al. | 701/1 |
| 6,169,946 B1 | 1/2001 | Griessbach | 701/45 |
| 6,170,864 B1 * | 1/2001 | Fujita et al. | 280/735 |
| 6,285,761 B1 * | 9/2001 | Patel et al. | 380/44 |

FOREIGN PATENT DOCUMENTS

DE     197 31 219 A  *  6/1999

OTHER PUBLICATIONS

International Search Report dated Jul. 18, 2001.

* cited by examiner

Primary Examiner—William A. Cuchlinski, Jr.
Assistant Examiner—Marthe Marc-Coleman

(57) ABSTRACT

A vehicle occupant protection activation system includes a satellite sensor which communicates with a safety controller for controlling each safety system. If a heightened likelihood of a vehicle crash or roll-over condition exists, the satellite sensor sends a safing message to the safety controller. When the safing message is received by the safety controller, it responds to the satellite sensor with a safing response including a seed message therein. The seed message is temporarily stored in the safety controller and is also stored by the satellite sensor. If it is determined that the event requires deployment, the satellite sensor sends a deploy command to the safety controller that includes the seed message therein to authenticate the command. The safing controller is thus assured that the deploy command is authorized and inadvertent deployment due to a single point fault in the satellite sensor is prevented.

24 Claims, 2 Drawing Sheets

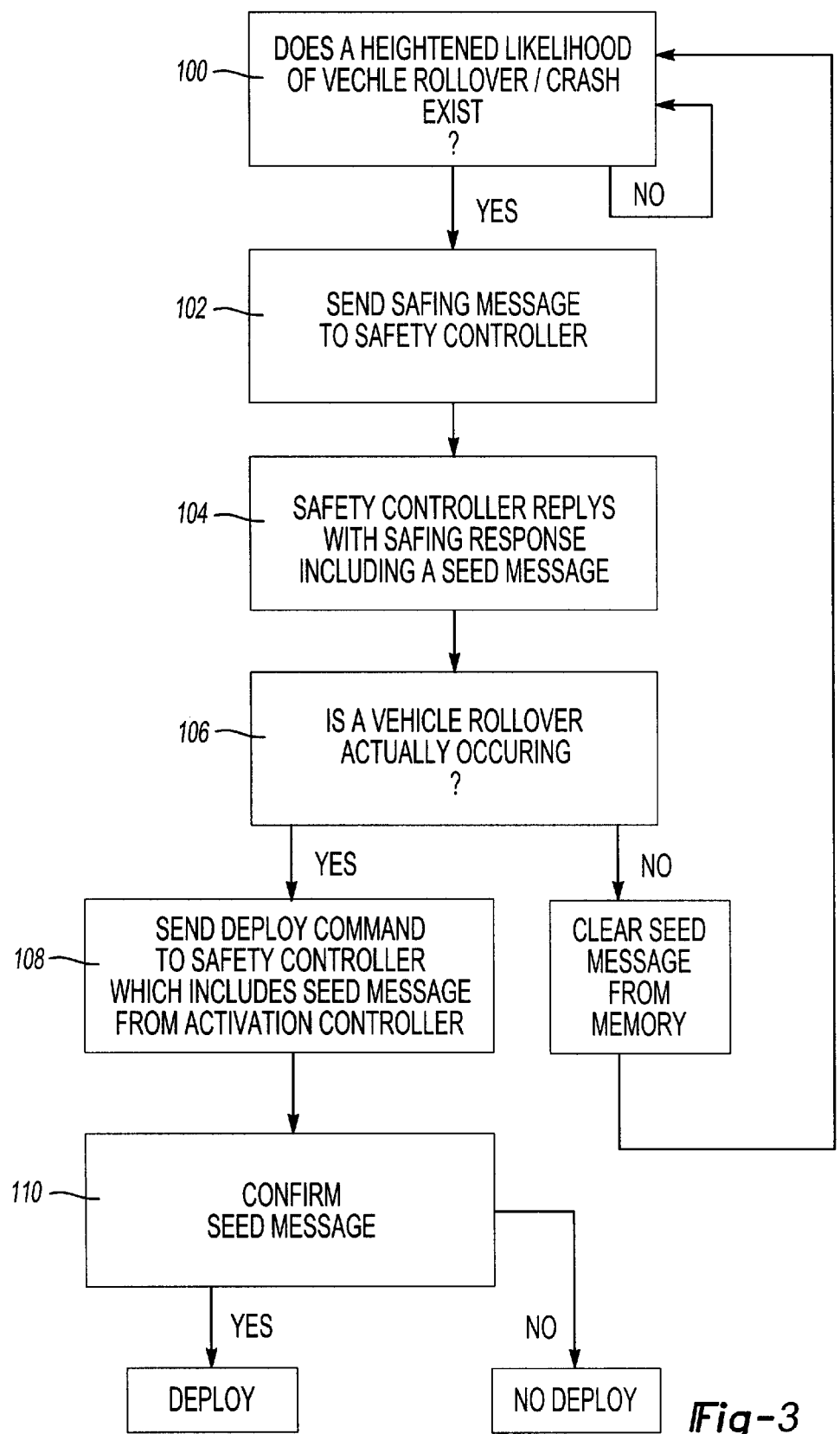

SAFING METHOD FOR A VEHICLE OCCUPANT PROTECTION SAFETY SYSTEM

The present invention claims priority to U.S. Provisional Patent Application Ser. No. 60/194,300, filed Apr. 3, 2000.

BACKGROUND OF THE INVENTION

The present invention relates to an occupant protection safety system, and more particularly to a safing system which prevents inadvertent deployment.

If a vehicle crash or roll-over event occurs, occupant protection safety systems installed in the vehicle must be activated in timely fashion; these include, for example, roll-over bars, belt tensioners, front and side airbags, etc.

Satellite sensors are typically provided to sense vehicle frontal, side, or roll-over crash events. The satellite sensors communicate with a safety controller which physically controls and diagnoses faults in the occupant protection safety systems.

To ensure also that the occupant protection systems are in fact activated only in the event of a crash or a roll-over, incorrect detections must be excluded to the greatest extent possible. Further, component failures must be assured of not inadvertently deploying the safety systems. It is known to provide redundant microcontrollers and sensors to assure no single component failure will result in inadvertent airbag deployment. However, redundant components may result in an expensive system in which the redundant components may provide conflicting data.

Accordingly, it is desirable to provide an occupant protection activation system which does not require redundant microcontrollers and minimizes the likelihood of inadvertent deployment, due to a microcontroller failure in the satellite sensor.

SUMMARY OF THE INVENTION

The vehicle occupant protection activation system according to the present invention includes one or more satellite sensors which communicate with a safety controller. The satellite sensor(s) and safety controller assure that the occupant protection systems are activated only in the event of vehicle crash or roll-over.

In operation, the satellite sensors communicate with the safety controller to identify whether a heightened likelihood of a vehicle crash event or roll-over exists. If a heightened likelihood of such an event exists the corresponding satellite sensor sends a safing message to the safety controller. When the safing message is received by the safety controller it responds to the satellite sensor with a safing response including a seed message therein. The seed message is temporarily stored in the satellite sensor and is also stored by the safety controller. The safety controller is now "armed" for the corresponding safety system.

The satellite sensor confirms whether the safety system deployable vehicle event is, in fact, actually occurring. If it is determined that the event requires deployment, the satellite sensor sends a deploy message to the safety controller that includes the seed message therein to authenticate the command. The safety controller is thus assured that the deploy command is authorized and inadvertent deployment is prevented, which could have been caused by a failure in the satellite sensor microcontroller. A microcontroller failure in the satellite sensor would prevent it from both receiving and transmitting the seed message to the safety controller, while concurrently determining a deployable event has occurred.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a flow chart representing the operation of the occupant protection activation system.

DETAILED DESCRIPTION OF THE PREFERRED EMBODIMENT

Figure 1:
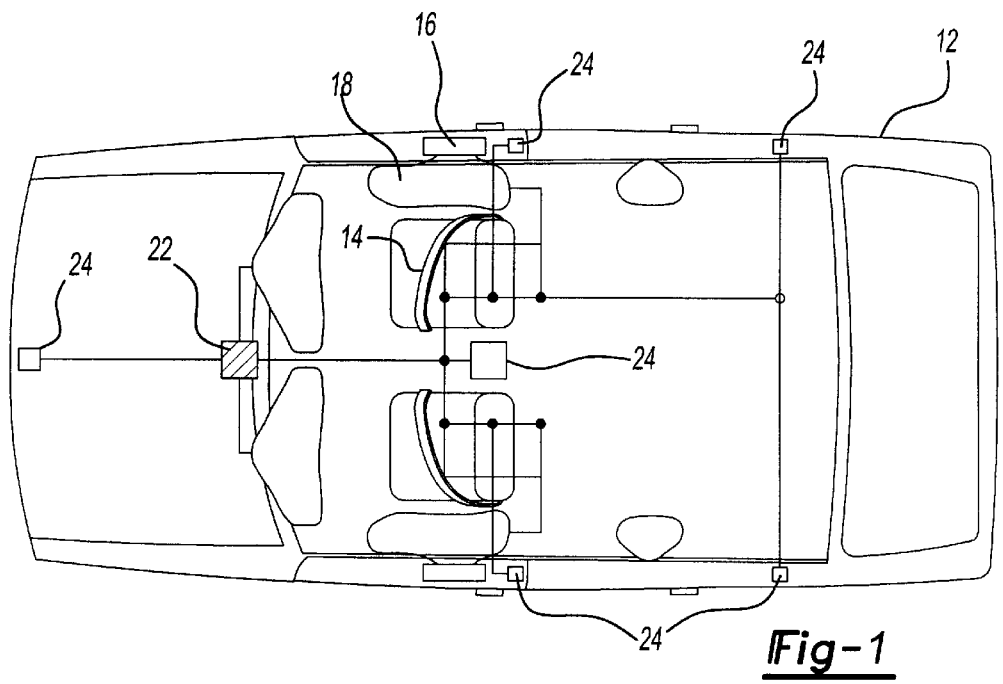
FIG. 1 is a general top view of a vehicle including an occupant protection activation system according to the present invention.

FIG. 1 illustrates an occupant protection activation system 10 for a vehicle 12. The activation system 10 selectively actuates at least one vehicular safety system such as a seat belt pretension system 14, a side airbag 16, curtain airbag 18 (each illustrated substantially schematically), or the like.

Figure 2:
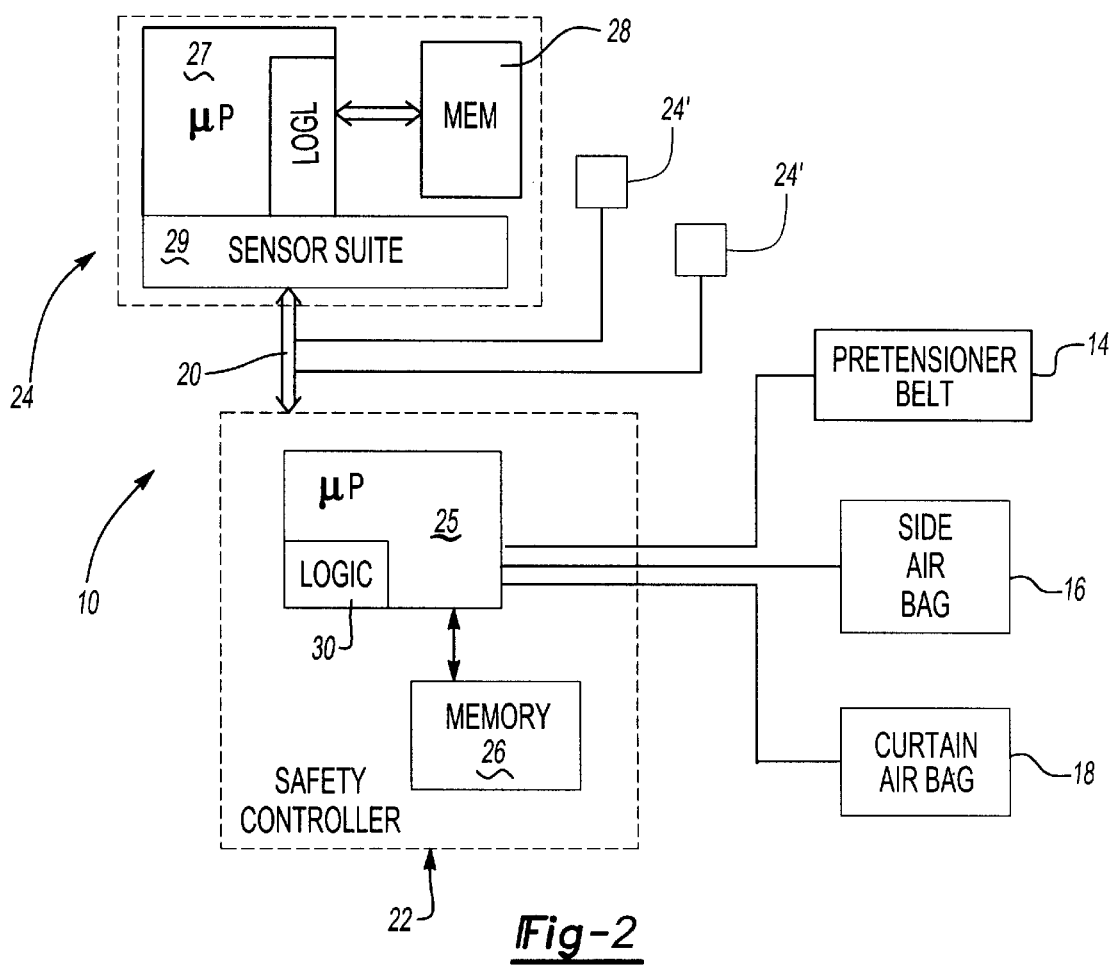
FIG. 2 is a block diagram schematically illustrating the occupant protection activation system.

Referring to FIG. 2, the occupant protection activation system 10 includes a safety controller 22 which communicates with a satellite sensor 24 over a communication bus 20 or the like. It should be understood that a plurality of satellite sensors 24' may also be connected to the safety controller 22. The safety controller 22 generally includes a CPU 25 and storage device 26 connected to the CPU 25. The storage device 26 may include a hard drive, CD ROM, DVD, RAM, ROM or other optically readable storage, magnetic storage or integrated circuit. The safety controller 22 operates to activate each occupant protection system 14, 16, 18.

The satellite sensor 24 generally includes a CPU 27 and a storage device 28 connected to the CPU 27. The satellite sensor 24 preferably includes one or more sensors 29 to sense a plurality of parameters including acceleration and/or roll angles of the vehicle and to detect a crash or roll-over event. It should be understood that satellites sensors are typically located in likely impact or "crush" areas of the vehicle 12 (FIG. 1) to more rapidly identify the likelihood of a front or side crash. In the case of a rollover satellite, it can be located away from the safety controller in order to better sense vehicle rollover conditions.

The safety controller 22 includes control logic circuitry 30 to receive and interprets signals from the satellite sensor 24 to determine whether to deploy the vehicular safety systems 14, 16, 18 as described more fully hereinafter. Upon receiving a message indicating a crash or roll-over situation is occurring the safety controller 22 generates a corresponding actuator signal to actuate the corresponding vehicular safety system 14, 16, and/or 18.

Referring to FIG. 3, a flow chart schematically represents the control logic 30 embodied in the safety controller 22 according to the instant invention. In operation, the satellite sensor 24 communicates with the safety controller 22 to identify whether a heightened likelihood of a vehicle crash or roll-over condition exists as illustrated by step 100. The satellite sensor 24 preferably interprets the sensed parameters to determine whether the sensed conditions exceed a predetermined condition which indicates that a crash or roll-over is likely to occur. It should be understood that the predetermined condition which indicates a heightened likelihood of vehicle crash or roll-over is particularly tailored for the vehicle type and determination of such an envelope is well within one reasonably skilled in the art.

If a heightened likelihood of a vehicle crash or roll-over condition does exist, the satellite sensor 24 sends a safing message to the safety controller 22 at step 102. The safing message prepares the safety controller 22 for activation. In other words, the safing message "arms" the safety controller 22 for substantially immediate activation. By so "arming" the safety controller 22 the response time of each safety system 14-20 is essentially shortened as some of the multiple messages required to activate are transmitted prior to the deployment decision.

When the safing message is received by the safety controller 22 it responds to the satellite sensor 24 with a safing response including a seed message therein at step 104. The random seed message is temporarily stored in the safety controller 22 and is also stored by the satellite sensor 24 storage device 28 (FIG. 2). It should be understood that the seed message can be any particular alphanumeric or other identifiable seed. Moreover, the seed can be randomly generated or predetermined, as long as the satellite sensor has no prior knowledge of the seed message. The safety controller 22 for each safety system 14-20 is now "armed" as the seed message is known by the satellite sensor 24 and the safety controller 22.

The satellite sensor 22 further identifies whether a crash or vehicle roll-over condition is actually occurring at step 106. The satellite sensor 24 interprets the plurality of parameters sensed to determine whether the sensed conditions exceed a second predetermined condition which indicates that a vehicle crash or roll-over is occurring. Again, the predetermined condition which indicates that a vehicle crash or roll-over is occurring and determination of such an envelope is well within one reasonably skilled in the art.

If it is determined that the event requires deployment, the satellite sensor sends a deploy command to the safety controller 22 at step 108. The deploy command includes the seed message therein to authenticate the command. The safety controller 22 confirms the seed message at step 110, and is thus assured that the deploy command is authorized and inadvertent deployment is prevented. It should be further understood that the deployment decision may be determined individually for each safety system 14-20 such that only the proper safety systems for the sensed event are activated. Further, the second predetermined condition is preferably tailored for each particular safety system, for example only, a deploy command for the deployment of a roll-bar may have a lesser deployment threshold than an airbag.

If it is determined that the event does not require deployment, the safety controller 22 clears the seed message from its memory register at step 110. The seed message is preferably cleared after a predetermined time period, however, the seed message may additionally or alternatively be cleared when the satellite sensor indicates that a third predetermined condition exists. The safety controller and each safety system 14-20 is thus returned to a lower ready state such that inadvertent deployment is prevented.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of safing a vehicle occupant protection activation system comprising the steps of:
   (1) transmitting a safing message from a satellite sensor to a safety controller remote from the satellite sensor;
   (2) replying to said safing message with a seed message; and
   (3) transmitting a deploy command including said seed message.

2. A method as recited in claim 1, wherein step (2) further including generating a random seed message.

3. A method as recited in claim 1, further including determining whether a heightened likelihood of an event condition exists prior to said step (1).

4. A method as recited in claim 3, wherein said event condition includes a vehicle crash event.

5. A method as recited in claim 3, wherein said event condition includes a vehicle roll-over event.

6. A method as recited in claim 3, wherein said step (3) occurs after said event condition is confirmed.

7. A method as recited in claim 1, wherein said step (2) further includes arming a vehicle safety system.

8. A method of safing a vehicle occupant protection activation system comprising the steps of:
   (1) determining whether a heightened likelihood of an event condition exists;
   (2) transmitting a safing message;
   (3) replying to said safing message with a seed message;
   (4) confirming that said event condition exists; and
   (5) transmitting a deploy command including said seed message from a satellite sensor to a safety controller in response to said step (4).

9. A method as recited in claim 8, wherein said step (3) further including generating a random seed message.

10. A method as recited in claim 8, wherein said event condition includes a vehicle crash event.

11. A method as recited in claim 8, wherein said event condition includes a vehicle roll-over event.

12. A method as recited in claim 8, wherein said step (1) includes sensing a first predetermined condition.

13. A method as recited in claim 12, wherein said step (4) includes sensing a second predetermined condition.

14. A method as recited in claim 8, wherein said step (3) further includes arming a vehicle safety system.

15. A vehicle occupant protection activation system, comprising:
   a satellite sensor;
   a safety controller in communication with said satellite sensor, said satellite sensor including control logic for determining whether a heightened likelihood of a vehicle crash or rollover event condition exists and for sending a safing message in response thereto;
   said safety controller in communication with an occupant protection safety system and said satellite sensor, said safety controller responsive to said safing message with a seed message, said safety controller operable to deploy said occupant protection safety system only in response to a deploy command from said satellite sensor which includes said seed message.

16. The vehicle occupant protection activation system as recited in claim 15, wherein said occupant protection safety system includes side airbag.

17. The vehicle occupant protection activation system as recited in claim 15, wherein said occupant protection safety system includes a seat belt pretensioner.

18. The vehicle occupant protection activation system as recited in claim 15, wherein said occupant protection safety system includes a side curtain airbag.

19. The vehicle occupant protection activation system as recited in claim 15, further including a plurality of satellite sensors.

20. The vehicle occupant protection activation system as recited in claim 15, wherein said vehicle event condition is a vehicle roll-over.

21. A method of safing a vehicle occupant protection activation system comprising the steps of:
   (1) transmitting a safing message from a satellite sensor;
   (2) replying to said safing message with a seed message from a safety controller;
   (3) transmitting a deploy command including said seed message; and wherein step (2) further comprises replying to a satellite sensor from a safety controller.

22. A method of safing a vehicle occupant protection activation system comprising the steps of:
   (1) transmitting a safing message;
   (2) replying to said safing message with a seed message; and
   (3) transmitting a deploy command including said seed message from a satellite sensor to a safety controller.

23. A method of safing a vehicle occupant protection activation system comprising the steps of:
   (1) determining whether a heightened likelihood of an event condition exists;
   (2) transmitting a safing message from a satellite sensor to a safety controlled remote from the satellite sensor;
   (3) replying to said safing message with a seed message;
   (4) confirming that said event condition exists; and
   (5) transmitting a deploy command including said seed message in response to said step (4).

24. A method of safing a vehicle occupant protection activation system comprising the steps of:
   (1) determining whether a heightened likelihood of an event condition exists;
   (2) transmitting a safing message from a satellite sensor;
   (3) replying to said safing message from said satellite sensor with a seed message from a safety controller;
   (4) confirming that said event condition exists; and
   (5) transmitting a deploy command including said seed message in response to said step (4).

\* \* \* \* \*